March 30, 1943.  C. A. OLSEN  2,315,074
GARDEN IMPLEMENT
Filed Oct. 21, 1940
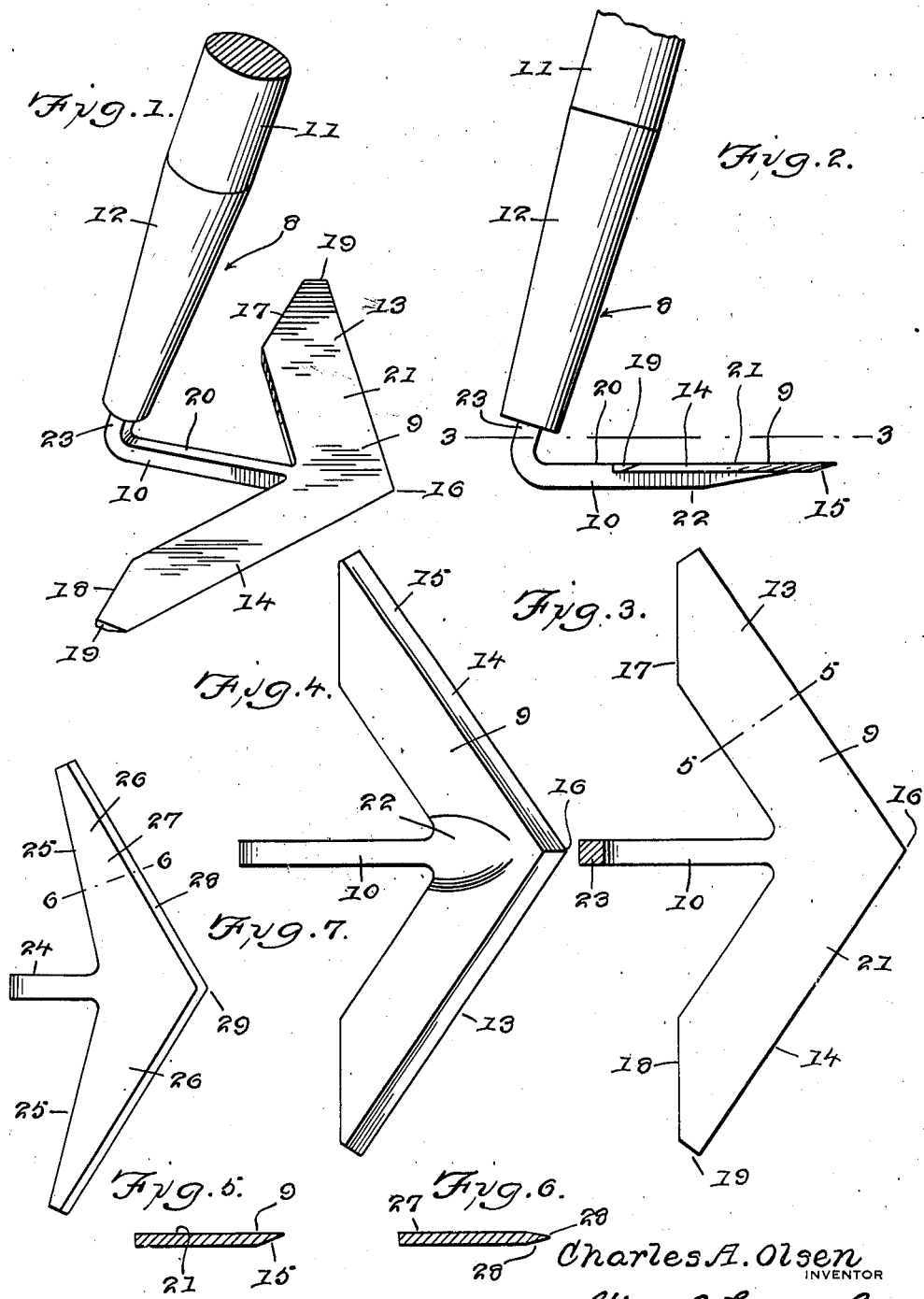
Charles A. Olsen
INVENTOR
BY Victor J. Evans & Co.
ATTORNEYS Patented Mar. 30, 1943

2,315,074

UNITED STATES PATENT OFFICE 2,315,074

GARDEN IMPLEMENT

Charles A. Olsen, Sioux Falls, S. Dak.

Application October 21, 1940, Serial No. 362,140

1 Claim. (Cl. 97—65)

The present invention relates to garden tools and more particularly to an improved cultivator and weeding hoe.

The primary object of the invention is to provide a hoe having a blade formed with a shear-type cutting edge rendering it possible to pull the hoe into the soil in an easy manner to effectively loosen the soil around small young plants while shearing or cutting the grass and weed roots therearound.

Another object of the invention is to provide a hoe having a novel form of blade, the shape of which makes it possible to closely cultivate the most tender plants and to also eliminate weeds, grass and the like without disturbing the plants.

The invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a perspective view of a hoe embodying the features of the present invention.

Figure 2 is a side elevational view thereof.

Figure 3 is a sectional view taken substantially on line 3—3 of Figure 2, the blade of the hoe being shown in top plan.

Figure 4 is a plan view of the front face of the hoe blade.

Figure 5 is a sectional view through the blade being taken substantially on line 5—5 of Figure 3.

Figure 6 is a sectional view of a modified form of the invention taken substantially on line 6—6 of Figure 7.

Figure 7 is a top plan view of the blade of a modified form of the invention.

Referring to the drawing for a more detailed description thereof, the improved hoe is generally designated by the reference numeral 8 and includes a blade 9, shank 10 supported within a handle 11 by means of a ferrule 12. The blade 9 is normally disposed at right angles to the handle 11 and includes wing-like portions 13 and 14 diverging at an angle relative to the shank 10. One face of the blade has its edges bevelled as indicated at 15, said edges terminating in a relatively sharp point 16 midway of the wing portions 13 and 14. The bevelled cutting edge 15 creates a shearing action as the blade penetrates the soil and is pulled forwardly by the handle while cultivating plants growing in the soil. The blade being relatively narrow with the wing-like portions renders it possible to cultivate relatively close to the most tender plants.

The ends of the wing portions 13 and 14 are beveled as indicated at 17 and 18, respectively, to form relatively sharp corners 19 which materially aid in properly cutting and disturbing the soil during cultivation. Formation of the corners 19 also renders it possible to bring the hoe into closer relation with young tender plants with a minimum possibility of damage or injury to the plants.

Another feature of the invention consists in the relation of the shank 10 with the blade 9, said shank being substantially of rectangular formation in cross section with the upper side 20 thereof in the plane of the upper side 21 of the blade. The shank is relatively thicker than the main portions of the blade and provides a wide member 22 at the lower side of the blade welded or otherwise secured in the angle thereof. The upper portion 23 of the shank extends at right angles and is secured in the end of the handle by means of the ferrule 12. The arrangement whereby the upper side 20 of the shank 10 is in the plane with the upper face of the blade 9 causes the shank to follow the blade into the soil with the creation of a minimum of pressure on the blade. The soil is not unnecessarily disturbed when contacted by the blade but instead cuts through the soil relatively close to the plants without disturbing the roots thereof. Weeds, grass and the like will be eliminated by the shearing action of the cutting blade.

In Figure 7 of the drawing there is shown a modified form of blade which is similar in construction to the preferred form insofar as the shank 24 is concerned. However, it will be observed that the rear faces 25 of the wing-like portions 26 taper from the shank to the outer edge of said wing-like portions instead of being bevelled as indicated at 17 and 18 in the preferred form. Each face of the blade 27 has its edges bevelled as indicated at 28 to form cutting edges which meet at the point 29. The shank 24 is supported in a handle in the manner previously described.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed is:

In a weeding device, a flat blade of approximately V-shaped configuration forming a forwardly protruding center point and rearwardly diverging complementary wing portions, the rear ends of the said wing portions being tapered to form longitudinally directed edges at the outer ends, the front edges of the blade being bevelled at the under side to provide relatively sharp leading edges, an elongated shank extended rearward from the center of the blade having its top edge flush with the flat top face of the blade and having a thickness exceeding that of the blade with the forward portion bevelled to form a blade guiding inclination under the center portion of the blade, an upwardly directed extension at the rear end of the shank, a socket formed on the said extension, and a handle having its lower end secured in the said socket and extending upwardly and at a slight forward inclination with relation to the horizontal plane of the blade.

CHARLES A. OLSEN.